Figure 1:
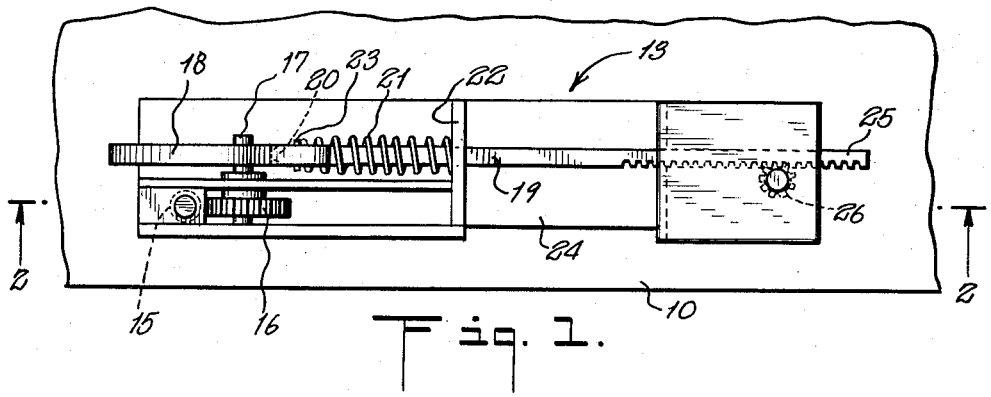

Nov. 24, 1953          R. W. FOREMAN ET AL          2,660,086
         APPARATUS FOR COORDINATING OPERATING WAVE LENGTH
             AND SLIT SIZE IN SPECTROPHOTOMETERS
                    Filed April 19, 1951

INVENTORS
ROBERT W. FOREMAN
BY MELVIN M. FINK

THEIR ATTORNEYS

Patented Nov. 24, 1953

2,660,086

UNITED STATES PATENT OFFICE 2,660,086

APPARATUS FOR COORDINATING OPERATING WAVE LENGTH AND SLIT SIZE IN SPECTROPHOTOMETERS

Robert W. Foreman and Melvin M. Fink, Cleveland, Ohio, assignors to The Standard Oil Company, Cleveland, Ohio, a corporation of Ohio Application April 19, 1951, Serial No. 221,882

1 Claim. (Cl. 88—14)

The present invention relates to spectrophotometers and, more particularly, to attachments for single-beam spectrophotometers having a source of radiation providing a continuous emission spectrum, an adjustable-size slit, and a wavelength control member.

Spectrophotometers are well known and the construction of a typical spectrophotometer may be briefly summarized. Light from a commercial blackbody radiator is interrupted at some low audio-frequency and, after transmission by a suitable optical system, is directed in a beam through a cell containing a liquid or gaseous sample. After emerging from the sample cell, the light beam falls upon an entrance slit. An image of the slit is directed by a spherical mirror towards a prism serving to disperse the light beam, which beam next falls upon a rotatable Littrow mirror. Light reflected by the mirror is returned in the direction of its origin and dispersed a second time by the prism and focused by the spherical mirror on an exit slit which lies in the same plane as the entrance slit. An image of the exit slit is diverted by a plane mirror out of the path of the entering beam and allowed to impinge upon a photosensitive device, such as a thermocouple. This device produces an alternating signal in the input of a suitable amplifier. After rectification and further amplification, a voltage is produced at the output terminals of the spectrophotometer having an amplitude functionally related to the radiant energy transmitted by the sample at adjacent points in the spectrum, as the operating wavelength is altered by gradually rotating the Littrow mirror.

The light or radiant energy source in spectrophotometers has, as is well known, a continuous spectral energy distribution such as to provide maximum energy radiation at some particular wavelength and decreasing output at wavelengths above or below the point of maximum radiation. In the conventional use of spectrophotometers the instrument is balanced with a certain slit size at this maximum wavelength and recordings taken at increasing or decreasing wavelengths until the recorded value falls below some predetermined level, say, 50% of the initial value. In order to obtain recordings over a useful spectral range, the slit size must be repeatedly adjusted, perhaps eight or ten times, to obtain a complete spectrum. While this method of sectionally recording a spectrum is effective, it is somewhat unsatisfactory in that it requires close attention on the part of the operator and considerable manipulation of the instrument controls.

Accordingly, an object of the present invention is to provide an arrangement which permits continuous operation of a spectrophotometer throughout a desired spectral range after an initial instrument balance is obtained.

Another object of the invention is to provide an attachment for a commercial spectrophotometer which obviates recording spectra in sections.

A further object of the invention is to decrease the time required for recording spectra and reduce the possibility of operational errors.

The present invention achieves the above and other objects by coordinating the operating wavelength of a spectrophotometer with the size of the spectrophotometer slit in such manner as tends to render the radiant energy recorded in the absence of a sample independent of the operating wavelength. The particular mechanical embodiment of the invention disclosed herein was chosen because of the relative simplicity of its construction and illustration. This embodiment is capable of accurately reproducing recordings and is readily adaptable to commercial spectrophotometers.

Figure 2:
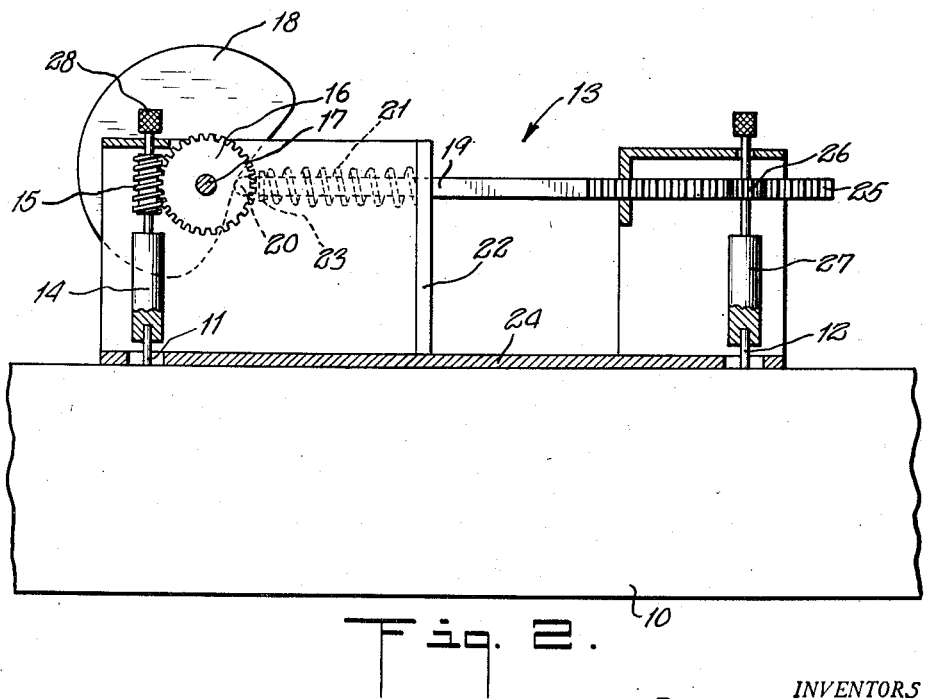

In order that the present invention may be more clearly understood it will now be described in detail, reference being made to the drawings, wherein:

Figure 1 is a plan view of a mechanical embodiment of the present invention; and Figure 2 is a view in elevation of the mechanism of Figure 1 taken along dashed line 2—2 in Figure 1.

Referring now to Figures 1 and 2, a commercial spectrophotometer 10 is shown with a wavelength drive-shaft 11 and a slit drive-shaft 12. An attachment 13, forming the essence of the present invention, is provided for coupling the slit drive-shaft 12 and the wavelength drive-shaft 11 in such speed ratio as tends to compensate for the inherent variation in the indicated output of the spectrophotometer when the operating wavelength is altered, which variation is caused by the spectral energy distribution of the source of radiation employed in the spectrophotometer. The Littrow mirror, the angular position of which determines the operating wavelength, and the spectrophotometer slit are not illustrated, inasmuch as they are conventional components of the spectrophotometer and, per se, form no part of the present invention.

An auxiliary shaft 14 is connected to wavelength drive-shaft 11 and carries a worm 15 which meshes with a gear 16. Gear 16 is mounted on a horizontal shaft 17 which also supports a cam 18 adapted to turn in unison with gear 16. A horizontal rod 19 has a rounded end 20 which is pressed by a helical spring 21 into engagement with the periphery of cam 18. Spring 21 surrounds rod 19 and acts in compression between an upright support 22 and a collar 23 fixed to the rod 19. Rod 19 serves as a cam-follower and is mounted for translational movement in the upright support 22 which is secured to a base plate 24 attached to the spectrometer 10. A rack 25 is formed on the opposite end of rod 19 and is positioned to engage a pinion 26 which is mounted on an auxiliary shaft 27 connecting with the slit drive-shaft 12.

In operation, the wavelength drive-shaft 11 is rotated manually by means of knob 28 or by a drive-motor (not shown), which may be connected in parallel with knob 28. Rotation of shaft 11 acts through the intervention of the cam 18, rod 19 and associated gearing to turn slit drive-shaft 12 which alters the size of the slit in such direction and amount as to at least partially compensate for change in the radiant energy output of the spectrophotometer with changing operating wavelengths under standard or reference conditions.

Ideally, the energy output of the spectrophotometer should remain constant when a reference or standard spectrum is recorded. This ideal is not, however, either necessary or practical to obtain. It is only necessary that the radiant energy recorded in the absence of a sample be held within predetermined limits. These limits may under some conditions, when the spectral range is restricted, be maintained by means of a simple linkage or a constant speed-ratio gear train, coupling the wavelength drive-shaft and the slit drive-shaft. In the general case however, a non-linear coupling must be provided. For most practical purposes a single cam, as shown in Figures 1 and 2, is sufficient to permit the recorded radiant energy to be maintained between useful limits. However, an additional cam is contemplated where there are extremely rapid energy changes in an extended spectral range. Under such conditions it is mechanically difficult to make sufficient correction with a single cam.

The shape of the cam 18 in the coupling mechanism illustrated in Figures 1 and 2 may be determined by the following procedure. First, the slit width necessary for constant recorded radiant energy under standard or reference conditions is determined as a function of the operating wavelength over the desired spectral range. Next, the operating wavelength is tabulated as a function of the angular position of wavelength drive-shaft 11. Then a similar tabulation is made of the slit width as a function of the angular position of slit drive-shaft 12. Now there is determined for each incremental turn of the wavelength drive-shaft 11 the rotation of the slit drive-shaft 11 required to compensate the slit width. The distance that rod 19 must move to give the required rotation of slit drive-shaft 12 is determined for a given rack 25 and pinion 26. A gear 16 is selected which will not be rotated more than one full turn thoughout the complete range of operating wavelengths. Then the required position of rod 19 is determined for each angular position of gear 16. Finally, as many radii are calculated as is necessary to define the cam 18.

A particular embodiment of the invention was attached to a Beckman IR-2 infrared spectrophotometer, which has the shafts 11 and 12 as shown in the drawing. The spectrophotometer employs a Nernst Glower as a source of radiation. With this apparatus the energy recorded for reference purposes, with no sample in the sample cell, remained within 50% of full scale throughout a spectral range of 5.4 to 12.0 microns. The width of slit was continuously increased from approximately 0.09 millimeter at the short end of the wavelength range to approximately 0.45 millimeter at the long end of the range. The recordings were reproducible with an error not greater than one percent of full scale at any point. The time for recording a complete spectrum was approximately one-half that previously required for the usual method of recording a spectrum in sections.

In view of the fact that the control of the operating wavelength of the spectrophotometer may be coordinated with the adjustment of the size of the spectrophotometer slit in seemingly different ways, for example, electromechanically without direct mechanical connection between the spectrophotometer controls, the claim is not to be interpreted in the light of the particular mechanism shown in the drawing and discussed in detail, since this embodiment serves only to exemplify the invention and is solely for illustrative purposes.

We claim:

In a single-beam spectrophotometer having a source of radiation providing a continuous emission spectrum and having a slit adjustable by a slit drive-shaft and an operating wavelength controlled by a wavelength drive-shaft, and wherein said drive-shafts extend from the upper plane of a casing of said spectrophotometer in substantially parallel directions, a slit drive mechanism comprising a worm mounted on the wavelength drive-shaft, a gear meshing with said worm, a disc-type cam driven by said gear, a rod mounted for movement in a plane above and substantially parallel to said spectrophotometer casing plane, a cam-follower mounted on one end of said rod for engagement with the periphery of said cam, a spring urging said cam-follower against the periphery of said cam, a rack on the other end of said rod, and a pinion mounted on the slit drive-shaft and meshed with said rack, whereby the slit is adjusted according to the peripheral shape of said cam to tend to compensate for the spectral energy distribution of the source of radiation as the operating wavelength of the spectrophotometer is altered.

ROBERT W. FOREMAN.
MELVIN M. FINK.

References Cited in the file of this patent

UNITED STATES PATENTS

| Number | Name | Date |
|---|---|---|
| 2,499,322 | Mather et al. | Feb. 28, 1950 |